United States Patent [19]

Miyahara et al.

[11] Patent Number: 5,744,576
[45] Date of Patent: Apr. 28, 1998

[54] PROCESS FOR PRODUCING POLY (PHENYLENE SULFIDE)

[75] Inventors: Michihisa Miyahara; Hiroyuki Sato; Yoshikatsu Satake, all of Fukushima-ken, Japan

[73] Assignee: Kureha Kagaku Kogyo K.K., Tokyo, Japan

[21] Appl. No.: 888,599

[22] Filed: Jul. 7, 1997

Related U.S. Application Data

[63] Continuation of Ser. No. 576,358, Dec. 21, 1995, abandoned.

[30] Foreign Application Priority Data

Dec. 28, 1994 [JP] Japan ................... 6-337557

[51] Int. Cl.$^6$ ........................................... C08G 75/14
[52] U.S. Cl. ........................................... 528/388
[58] Field of Search ................................. 528/388

[56] References Cited

U.S. PATENT DOCUMENTS

| | | | |
|---|---|---|---|
| 3,354,129 | 11/1967 | Edmonds et al. | 528/388 |
| 3,919,177 | 11/1975 | Campbell | 528/388 |
| 4,038,263 | 7/1977 | Edmonds et al. | 528/388 |
| 4,645,826 | 2/1987 | Iizuka et al. | 528/388 |
| 4,812,539 | 3/1989 | Iizuka et al. | 528/388 |
| 4,814,430 | 3/1989 | Iwasaki et al. | 528/388 |
| 5,151,495 | 9/1992 | Inoue et al. | 528/388 |
| 5,179,194 | 1/1993 | Kawakami et al. | 528/388 |

FOREIGN PATENT DOCUMENTS

| | | |
|---|---|---|
| 0244187 | 11/1987 | European Pat. Off. . |
| 0344977 | 12/1989 | European Pat. Off. . |
| 45-3368 | 2/1970 | Japan . |
| 52-12240 | 4/1977 | Japan . |
| 59-219332 | 12/1984 | Japan . |
| 63-33775 | 7/1988 | Japan . |
| 1-161022 | 6/1989 | Japan . |
| 04255721 | 9/1992 | Japan . |
| 255721/1922 | 9/1992 | Japan . |

OTHER PUBLICATIONS

Koschinski et al., "Kinetik der Polyphenylensulfid–Synthese", Angewandte Makromolekulare Chemie, Oct. 1992, vol. 201, pp. 11–21.

*Primary Examiner*—Melvyn I. Marquis
*Attorney, Agent, or Firm*—Lowe, Price, LeBlanc & Becker

[57] ABSTRACT

In a process for producing poly(phenylene sulfide), in which an alkali metal sulfide is reacted with a dihalo-aromatic compound in an organic amide solvent, the reaction is conducted through the following Steps 1 and 2, thereby efficiently providing granular, high-molecular weight poly (phenylene sulfide) having excellent whiteness in a short period of time and at a high yield. Step 1: a step comprising reacting the alkali metal sulfide with the dihalo-aromatic compound within a temperature range of 170°–270° C. in the organic amide solvent containing water in a proportion of 0.5–2.0 moles per mole of the alkali metal sulfide charged while raising the reaction temperature at an average heating rate of 0.1°–1° C./min in at least a temperature range of from 220° C. to 240° C., so as to give a conversion of the dihalo-aromatic compound of 70–98 mol %, thereby forming a: prepolymer of poly(phenylene sulfide); and Step 2: a step comprising adding water to the reaction system at a temperature of at least 235° C. in such a manner that water is present in a proportion of 2.1–10 moles per mole of the alkali metal sulfide charged, and continuing the reaction for 0.5–10 hours within a temperature range of 245°–290° C., thereby converting the prepolymer to high-molecular weight poly(phenylene sulfide).

4 Claims, No Drawings

PROCESS FOR PRODUCING POLY (PHENYLENE SULFIDE)

This application is a continuation of application Ser. No. 08/576,358, filed Dec. 21, 1995, which is abandoned.

FIELD OF THE INVENTION

The present invention relates to a process for producing poly(phenylene sulfide) (hereinafter abbreviated as "PPS"), and more particularly to a process for efficiently producing granular, high-molecular weight PPS in a short period of time and at a high yield. This invention also relates to a process for safely and economically producing PPS on an industrial scale.

BACKGROUND OF THE INVENTION

PPS is an engineering plastic excellent in heat resistance, chemical resistance, flame retardancy, mechanical strength, electrical properties, dimensional stability and the like, and is able to be molded or formed into various molded products, films, sheets, fibers, etc. by various molding or forming processes such as injection molding, extrusion and compression molding. Therefore, it is widely used in a wide field such as electrical and electronic equipments and parts, and automotive machine parts.

As a production process of PPS, Japanese Patent Publication No. 3368/1970 (corresponding to U.S. Pat. No. 3,354,129) has proposed a process wherein an alkali metal sulfide such as sodium sulfide is reacted with a dihalo-aromatic compound such as p-dichlorobenzene in an organic amide solvent such as N-methyl-2-pyrrolidone. However, the process disclosed in this publication can provide only low-molecular weight PPS low in melt viscosity. Such low-molecular weight PPS can be converted to a high-molecular weight polymer by heating the resultant polymer in the presence of air after the polymerization, thereby subjecting the polymer to oxidative curing. However, the cured PPS thus obtained is insufficient in mechanical properties, and is not linear, so that it is difficult to form and process it into a film, sheet, fiber or the like.

In order to obtain high-molecular weight PPS at the same time as polymerized, in recent years, there have been proposed various production processes with the above-mentioned process improved. As means for improving the polymerization process of PPS, it has been proposed to add various polymerization aids upon the reaction of the alkali metal sulfide and the dihalo-aromatic compound in the organic amide solvent. For example, it has been proposed to use, as the polymerization aid, an alkali metal carboxylate (Japanese Patent Publication No. 12240/1977; corresponding to U.S. Pat. No. 3,919,177), an alkaline earth metal salt of an aromatic carboxylic acid (Japanese Patent Application Laid-Open No. 219332/1984), an alkali metal halide (U.S. Pat. No. 4,038,263) or the sodium salt of an aliphatic carboxylic acid (Japanese Patent Application Laid-Open No. 161022/1989).

According to these processes, linear, high-molecular weight PPS can be obtained by polymerization only. However, it is necessary to add the polymerization aid in a comparatively large amount. The above documents describe the amount of the polymerization aid to be added as widely ranging from a small amount to a large amount. For obtaining PPS having a sufficiently high molecular weight, it is necessary to add a comparatively large amount of the polymerization aid. Furthermore, for obtaining PPS having a higher molecular weight, more expensive lithium acetate or sodium benzoate among the polymerization aids must be used in a large amount. For this reason, an enormous cost is required for the recovery of the polymerization aid. Therefore, such a process is undesirable as a production process on an industrial scale.

On the other hand, in Japanese Patent Publication No. 33775/1988 (corresponding to U.S. Pat. No. 4,645,826), it has been proposed to adopt a specific two-step polymerization process in a process for obtaining PPS by reacting an alkali metal sulfide and a dihalo-aromatic compound in an organic amide solvent. More specifically, in this publication, there has been proposed a two-step polymerization process including a preliminary polymerization step in which the alkali metal sulfide is reacted at a temperature of 180°–235° C. with the dihalo-aromatic compound in the presence of water in a proportion of 0.5–2.4 moles per mole of the alkali metal sulfide charged until the conversion of the dihalo-aromatic compound reaches 50–98 mol %, thereby forming a prepolymer having a low viscosity, and a final polymerization step in which water is added to the reaction system in such a manner that water is present in a proportion of 2.5–7 moles per mole of the alkali metal sulfide charged, and the reaction temperature is raised to 245°–290° C. to continue the reaction.

According to this two-step polymerization process, high-molecular weight PPS can be obtained without adding any polymerization aid. However, this process requires a comparatively long period of time to conduct the polymerization because the polymerization temperature in the preliminary polymerization step is low. If the polymerization temperature in the preliminary polymerization step is raised to shorten the polymerization time, an undesirable side reaction occurs with the advance of rapid exothermic reaction. As a result, the resulting polymer and the solvent used tend to be deteriorated, which causes such problems that the quality of the polymer is lowered. Besides, if the polymerization temperature in the preliminary polymerization step is raised, there is a great possibility that the reaction may run away to cause rapid increase in the internal pressure of a reactor. In the final polymerization step, water is added at a comparatively low temperature, and so the temperature in the reaction system is rapidly lowered, and the prepolymer formed is precipitated. As a result, there are such possibilities that the reaction rate may be lowered, and the polymerization reaction may be made uneven. Accordingly, there is a strong demand for development of a more improved process for efficiently producing granular, high-molecular weight PPS at a high yield in a short period of time.

Japanese Patent Application Laid-Open No. 255721/1992 has proposed a process for obtaining PPS by reacting a sulfur source such as an alkali metal sulfide with a polyhalogenated aromatic compound in an organic polar solvent, wherein the reaction is carried out at an average heating rate of 0.5° C./min or lower in the presence of water in a proportion lower than 0.3 mole per mole of S (a sulfur atom) in the sulfur source and an alkali metal carboxylate when the temperature of the liquid reaction mixture is raised from a temperature not higher than 220° C. to at least 260° C. In this process, however, it is necessary to use a large amount of the alkali metal carboxylate as a polymerization aid, and to limit water to the proportion lower than 0.3 mole per mole of the sulfur atom in the sulfur source. Therefore, this process involves many problems such as increase in energy cost upon dehydration and lengthened dehydration time.

OBJECTS AND SUMMARY OF THE INVENTION

It is an object of the present invention to provide a process for efficiently producing granular, high-molecular weight poly(phenylene sulfide) in a short period of time and at a high yield.

Another object of the present invention is to provide a process for producing poly(phenylene sulfide) excellent in whiteness and high in quality.

The present inventors have carried out an extensive investigation with a view toward overcoming the above-described problems involved in the prior art. As a result, it has been found that in a process for producing PPS according to a specified two-step polymerization process, a polymerization reaction in a preliminary polymerization step is conducted within a temperature range of 170°–270° C. while raising the reaction temperature at an average heating rate of 0.1°–1° C./min in a temperature range of from 220° C. to 240° C., whereby the whole polymerization time can be shortened to a great extent while preventing a rapid exothermic reaction, and granular, high-molecular weight PPS can be obtained at a high yield. According to the process of the present invention, PPS having whiteness higher than that of any conventional PPS can be obtained by selecting the polymerization conditions. The present invention has been completed on the basis of these findings.

According to the present invention, there is thus provided a process for producing poly(phenylene sulfide), in which an alkali metal sulfide is reacted with a dihalo-aromatic compound in an organic amide solvent, which comprises conducting the reaction through the following Steps 1 and 2:

Step 1:
a step comprising reacting the alkali metal sulfide with the dihalo-aromatic compound within a temperature range of 170°–270° C. in the organic amide solvent containing water in a proportion of 0.5–2.0 moles per mole of the alkali metal sulfide charged while raising the reaction temperature at an average heating rate of 0.1°–1° C./min in at least a temperature range of from 220° C. to 240° C., and optionally continuing the reaction within a temperature range of 240°–270° C., so as to give a conversion of the dihalo-aromatic compound of 70–98 mol %, thereby forming a prepolymer of PPS; and Step 2:
a step comprising adding water to the reaction system at a temperature of at least 235° C. in such a manner that water is present in a proportion of 2.1–10 moles per mole of the alkali metal sulfide charged, and continuing the reaction for 0.5–10 hours within a temperature range of 245°–290° C., thereby converting the prepolymer to high-molecular weight poly(phenylene sulfide).

DETAILED DESCRIPTION OF THE INVENTION

The present invention will hereinafter be described in detail.

Alkali metal sulfide:

Preferable examples of the alkali metal sulfide useful in the practice of the present invention include lithium sulfide, sodium sulfide, potassium sulfide, rubidium sulfide, cesium sulfide and mixtures of two or more of these compounds. Sodium sulfide is particularly preferred. These alkali metal sulfides can be used as hydrates or aqueous mixtures, or in anhydrous forms. In addition, an alkali metal sulfide prepared in situ in the reaction system from an alkali metal hydrosulfide and an alkali metal hydroxide may also be used.

If a part of the alkali metal sulfide charged is lost prior to the initiation of the reaction by a dehydrating operation and/or the like, the amount of the alkali metal sulfide charged in the present invention means the remainder with the loss taken from the actually charged amount.

Dihalo-aromatic compound:

Examples of the dihalo-aromatic compound useful in the practice of the present invention include dihalobenzenes such as p-dichlorobenzene, m-dichlorobenzene and p-dibromobenzene, and dihalo-aromatic compounds containing a substituent group other than halogens, such as 1-methoxy-2,5-dichlorobenzene and 3,5-dichlorobenzoic acid. Among these, those composed mainly of a p-dihalobenzene typified by p-dichlorobenzene are preferred, with those containing 80–100 mol % of p-dichlorobenzene being particularly preferred. Two or more different compounds of these dihalo-aromatic compounds may also be used in combination to form a copolymer.

Molecular weight modifier, and branching or crosslinking agent:

A monohalo compound (which may not be necessarily an aromatic compound) may be used in combination in order to form the terminals of the resulting PPS or to control the polymerization reaction or the molecular weight of the PPS. In addition, a tri- or higher-polyhalo compound (which may not be necessarily an aromatic compound), an active hydrogen-containing halo-aromatic compound, a halo-aromatic nitro compound and/or the like may also be used in combination in order to form a branched or crosslinked polymer.

Polymerization solvent:

In the present invention, an organic amide solvent is used as a polymerization solvent. As preferable examples of the organic amide solvent, may be mentioned aprotic organic amide solvents typified by N-alkylpyrrolidones such as N-methyl-2-pyrrolidone, N-ethyl-2pyrrolidone; caprolactams such as N-methyl-ε-caprolactam; 1,3-dialkyl-2-imidazolidinones; tetraalkylureas; and hexaalkylphosphoric triamides; and mixtures thereof because of their high stability to reaction. Among these, N-methyl-2-pyrrolidone (hereinafter abbreviated as "NMP") is particularly preferred.

The amount of the polymerization solvent to be used in the present invention is preferably within a range of 0.2–1 kg per mole of the alkali metal sulfide charged.

Polymerization aid:

In the present invention, a polymerization aid may be used with a view toward facilitating the reaction as needed, thereby obtaining high-molecular weight PPS in a shorter period of time. As specific examples of the polymerization aid, may be mentioned alkali metal carboxylates and lithium halides, which are generally known as polymerization aids for PPS. Alkali metal carboxylates are particularly preferred. The amount of the polymerization aid to be used may be comparatively small.

The alkali metal carboxylate is a compound represented by the general formula, $R(COOM)_n$ in which R is an alkyl, cycloalkyl, aryl, alkylaryl or arylalkyl group having 1–20 carbon atoms, M is an alkali metal selected from the group consisting of lithium, sodium, potassium, rubidium and cesium, and n is an integer of 1–3. The alkali metal carboxylate may also be used in the form of a hydrate or aqueous solution. As specific examples of the alkali metal carboxylate, may be mentioned lithium acetate, sodium acetate, potassium acetate, sodium propionate, lithium valerate, sodium benzoate, sodium phenylacetate, potassium p-toluate and mixtures thereof. The alkali metal carboxylate may be formed by adding an organic acid and at least one compound selected from the group consisting of alkali metal hydroxides, alkali metal carbonates, alkali metal bicarbonates to an organic amide solvent to react them in the solvent. Among the alkali metal carboxylates, sodium acetate is preferably used from the viewpoint of cheapness and easy availability.

The amount of these polymerization aids to be used is generally at least 0.02 mole, preferably 0.02–0.2 mole, more preferably 0.03–0.15 mole, most preferably 0.04–0.10 mole per mole of the alkali metal sulfide charged.

Amounts less than 0.02 mole are too little to sufficiently exhibit the effect of the polymerization aid. On the other hand, amounts exceeding 0.2 are economically disadvantageous. It is only necessary to contain these polymerization aids in the reaction system in at least the final polymerization step (Step 2). Accordingly, the time for the addition may be before the dehydration step prior to the initiation of the preliminary polymerization, at any time between the initiation of the preliminary polymerization and the middle of the final polymerization, or in any combination thereof.

Polymerization stabilizer:

A polymerization stabilizer may also be used for the purpose of stabilizing the polymerization reaction system and preventing side reactions. The polymerization stabilizer contributes to the stabilization of the polymerization reaction system to prevent undesirable side reactions. As an index to a side reaction, may be mentioned the formation of thiophenol. The formation of thiophenol is prevented by the addition of the polymerization stabilizer. Specific examples of the polymerization stabilizer include alkali metal hydroxides, alkali metal carbonates, alkaline earth metal hydroxides and alkaline earth metal carbonates. Of these, the alkali metal hydroxides such as sodium hydroxide, potassium hydroxide and lithium hydroxide are preferred. The alkali metal carboxylates as described above also act as a polymerization stabilizer and are hence included as one of the polymerization stabilizers to be used in the present invention.

These polymerization stabilizers may be used either singly or in any combination thereof and in a proportion of generally 0.05–0.2mole, preferably 0.055–0.1 mole, more preferably 0.06–0.09 mole per mole of the alkali metal sulfide charged. If this proportion is too low, the effect to stabilize the reaction system becomes insufficient. On the other hand, if the proportion is too high, an economic disadvantage is encountered, and the yield of the resulting granular polymer is lowered. It is hence not preferable to use the polymerization stabilizer in a proportion outside the above range. The time for the addition of the polymerization stabilizer may be before the dehydration step prior to the initiation of the preliminary polymerization, at any time between the initiation of the preliminary polymerization and the end of the final polymerization, or in any combination thereof. It is preferable to add it before the dehydration step or upon the initiation of the preliminary polymerization.

In the case where a part of the alkali metal sulfide is decomposed by a dehydration operation to form hydrogen sulfide, the alkali metal hydroxide formed as the result of such decomposition may serve as a polymerization stabilizer.

Polymerization reaction:

According to the present invention, in the process for producing PPS by reacting the alkali metal sulfide with the dihalo-aromatic compound in the organic amide solvent, the reaction is conducted through the following at least Steps 1 and 2. Additional steps such as a pretreatment step and a post-treatment step may be included.

Step 1

In Step 1 (preliminary polymerization step), the alkali metal sulfide is reacted with the dihalo-aromatic compound within a temperature range of 170°–270° C. in the organic amide solvent containing water in a proportion of 0.5–2.0 moles per mole of the alkali metal sulfide charged while raising the reaction temperature at an average heating rate of 0.1°–1° C./min in a temperature range of from 220° C. to 240° C., and the reaction is optionally continued within a temperature range of 240°–270° C., so as to give a conversion of the dihalo-aromatic compound of 70–98 mol %, thereby forming a prepolymer of the PPS.

Upon initiation of Step 1, the alkali metal sulfide and the dihalo-aromatic compound are added into the organic amide solvent in a temperature range of from room temperature to 220° C., preferably from 100° to 220° C., desirably, in an inert gas atmosphere. These raw materials may be charged either in no specific order or at the same time. The alkali metal sulfide is generally used in the form of a hydrate. If the water content in the alkali metal sulfide is lower than 0.5 mole per mole of the alkali metal sulfide charged, the necessary amount of water is added for supplementation. If the water content in the alkali metal sulfide is too high, a mixture containing the organic amide solvent and the alkali metal sulfide is heated prior to the addition of the dihalo-aromatic compound, thereby removing an excess of water out of the system. If water is overremoved by this operation, the deficiency is supplemented by adding water.

The amount of the co-existing water in the reaction system in Step 1 is within a range of 0.5–2.0 moles, preferably 1.0–1.9 moles per mole of the alkali metal sulfide charged. If the amount of the co-existing water is less than 0.5 mole, undesirable reactions such as decomposition of the PPS formed tend to occur. On the other hand, at a level exceeding 2.0 moles, the polymerization rate becomes markedly low, and the decomposition of the organic amide solvent and the PPS formed tend to occur. Thus, amounts outside the above range are not desirable.

The polymerization is conducted within a temperature range of 170°–270° C., preferably 180°–265° C. If the temperature is too low, the polymerization rate is too slow. On the other hand, at a temperature over 270° C., the PPS formed and the organic amide solvent are liable to be decomposed to form only PPS extremely low in polymerization degree.

In the process of the present invention, the reaction temperature is continuously raised at a defined heating rate in a temperature range of from 220° C. to 240° C. Namely, the reaction of the alkali metal sulfide with the dihalo-aromatic compound rapidly takes place in the temperature range of from 220° C. to 240° C., and so the heat of reaction is generated to a very great extent. Therefore, the reaction temperature is raised at a controlled rate. More specifically, the reaction temperature is raised at an average heating rate of 0.1°–1° C./min, preferably 0.15°–0.6° C./min, more preferably 0.2°–0.5° C./min. If the heating rate is lower than 0.1° C./min, the reaction time becomes longer, and sufficient efficiency is not obtained. Heating rates exceeding 1° C./min cause a rapid exothermic reaction. It is hence not preferable to raise the reaction temperature at a heating rate outside the above range.

In the present invention, the continuous elevation of the reaction temperature also includes multi-stage raising of at least two stages. In the case where the reaction temperature is raised by stages, it is preferable to raise the temperature by multi-stages of, preferably, at least three stages, more preferably, at least four stages in order to avoid a rapid exothermic reaction. From the viewpoint of the operation of reaction, continuous elevation of the temperature at a constant heating rate is particularly preferred.

The heating rate until the temperature is raised to 170°–220° C. is optional. However, it is preferable to raise the temperature at a heating rate not higher than 1° C./min in order to avoid a rapid reaction. It is also possible to continue the reaction within a temperature range of 240°–270° C. as needed after continuously raised to 240° C. In this case, it is preferable to raise the temperature at a heating rate not higher than 1° C./min in order to avoid a rapid reaction.

The rate of reaction of the halogen radicals in the dihaloaromatic compound is generally controlled to 0–45%, preferably 20–40%, more preferably 25–35% in the temperature range of 170°–220° C. When the reaction temperature is continuously raised to 240° C. after raised to 220° C., it is desirable to react the alkali metal sulfide with the dihaloaromatic compound in such a manner that the rate of reaction of the halogen radicals in the dihalo-aromatic compound is generally 60–90%, preferably 70–85%. The reaction can be more stably conducted by setting the rate of reaction in this manner.

In order to obtain high-molecular weight PPS, it is desirable that the amount (charged amount) of the dihaloaromatic compound to be used be generally within the range of 0.9–2.0 moles, preferably 0.95–1.5 moles per mole of the alkali metal sulfide charged. Proportions lower than 0.9 mole or higher than 2.0 moles make it difficult to obtain high-viscosity (high-polymerization degree) PPS suitable for processing. It is hence not preferable to use the dihaloaromatic compound in a proportion outside the above range.

Step 1 is switched to Step 2 when the conversion of the dihalo-aromatic compound in the reaction system reaches 70–98 mol %. If the conversion is lower than 70 mol %, undesirable reactions such as decomposition tend to occur upon final polymerization in Step 2. On the other hand, if the conversion exceeds 98 mol %, it is difficult to provide PPS of high polymerization degree even when the final polymerization is performed. A conversion of 85–95 mol % is preferable because PPS of high polymerization degree can be stably provided.

Here, the conversion of the dihalo-aromatic compound (abbreviated as "DHA") is calculated in accordance with the following equation. The amount of residual DHA can be generally determined by gas chromatography.

(a) In the case where DHA is added in excess of the alkali metal sulfide in terms of molar ratio:
Conversion=[DHA charged (mol)–Residual DHA (mol)]/ [DHA charged (mol)–Excessive DHA (mol)](b) In other cases than (a):
Conversion=[DHA charged (mol)–Residual DHA (mol)]/ DHA charged (mol)]

The rate of reaction of the halogen radicals in the dihaloaromatic compound means a proportion of the number of moles of a halogen salt formed to the number of moles twice of the alkali metal sulfide. The number of moles of the halogen salt formed can be determined, for example, by the silver nitrate titration.

In Step 1, PPS having a comparatively low molecular weight as demonstrated by a melt viscosity (as measured at 310° C. and a shear rate of 1200/sec) of about 0.1–30 Pa·s is generally formed. Therefore, the PPS formed in this step is referred to as a prepolymer.

Step 2

In Step 2 (final polymerization step), water is added to the reaction system in such a manner that water is present in a proportion of 2.1–10 moles per mole of the alkali metal sulfide charged, and the reaction is continued for 0.5–10 hours within a temperature range of 245°–290° C. to enhance the conversion of the dihalo-aromatic compound, thereby converting the PPS prepolymer formed in Step 1 to high-molecular weight PPS. The water is added to the reaction system at a temperature of at least 235° C. In the present invention, the polymerization aid such as the alkali metal carboxylate is preferably charged into the reaction system during at least the final polymerization because polymerization time can be shortened, and the resulting polymer can be provided as a polymer of high polymerization degree.

If the amount of the co-existing water in the reaction system is either less than 2.1 moles or more than 10 moles in Step 2, the polymerization degree of the PPS formed is lowered. In particular, it is preferable that the final polymerization be conducted in the presence of water in a range of from 2.2 moles to 7 moles because PPS of high polymerization degree can be easily obtained.

If the polymerization temperature in Step 2 is lower than 245° C., PPS of high polymerization degree can be hardly obtained. On the other hand, if it exceeds 290° C., there is a possibility that the PPS formed and/or the organic amide solvent may be decomposed. In particular, the temperature range of from 250° C. to 270° C. is preferred since PPS of high polymerization degree can be obtained with ease. The final polymerization step in the present invention is not a simple classification-granulation process of the PPS formed in the preliminary polymerization step, but a process required to cause the polymerization degree of the PPS prepolymer to enhance.

The polymerization time required for Step 2 is 0.5–10 hours, preferably 1–6 hours, more preferably 1–5 hours. If the polymerization time in the final polymerization step is too short, only PPS of low polymerization degree can be obtained. On the contrary, if the time is too long, the decomposition of PPS formed and the organic amide solvent tends to occur. Switching from the preliminary polymerization step to the final polymerization step may be done either by transferring a slurry obtained in the preliminary polymerization step to another reaction vessel, thereby conducting the reaction under the conditions for the final polymerization step, or by conducting both preliminary polymerization and final polymerization in the same reaction vessel with the polymerization conditions changed. The time at which water is added may be immediately before the temperature of the reaction system is raised to a temperature required for the final polymerization step after completion of the preliminary polymerization step, or after the temperature of the system is raised to the temperature required for the final polymerization step. It is however desirable that the reaction be continued for at least 0.5 hour thereafter.

Owing to the two-step polymerization process according to the present invention, there can be provided high-molecular weight PPS having a melt viscosity (as measured at 310° C. and a shear rate of 1200/sec) of generally at least 1 Pa·s, preferably 30–100 Pa·s, or a higher melt viscosity in some cases.

Post-treatment

The post-treatment in the polymerization process according to the present invention can be carried out by a method known Per se in the art. For example, after completion of the final polymerization reaction, the reaction mixture in the slurry cooled can be filtered as such without dilution or after dilution with water or the like, and the resulting polymer is washed with water and filtered repeatedly, and dehydrated or dried, whereby the PPS can be obtained.

The slurry containing the formed product may be subjected to filtration as it is in a heated state, thereby separating the polymer. After the filtration or sifting, the PPS recovered may be washed with an organic solvent such as the same organic amide solvent as the polymerization solvent, a ketone or an alcohol, and hot water. The PPS may be treated with an acid or a salt such as ammonium chloride.

PPS Formed

According to the process of the present invention, granular PPS, which has an average particle size of 150–3,000 µm and can be easily subjected to various handling methods, such as metering, and molding or forming and processing, can be obtained at a high yield. The PPS obtained by the process according to the present invention has a high molecular weight and is linear. It can hence be formed into extruded products such as sheets, films, fibers and pipes by extrusion, to say nothing of injection-molded products.

According to the process of the present invention, there can also be provided PPS excellent in whiteness and hence easy to tone, and high in quality. The PPS obtained by the process according to the present invention can be used singly, but may be compounded with various inorganic fillers, fibrous fillers and various synthetic resins.

ADVANTAGES OF THE INVENTION

According to the present invention, there is provided a process for efficiently producing granular, high-molecular weight PPS in a short period of time and at a high yield. Accordingly, the production process according to the present invention is suitable as a production process of PPS on an industrial scale.

EMBODIMENTS OF THE INVENTION

The present invention will hereinafter be described more specifically by the following examples and comparative examples. Physical properties in the examples were determined in the following manner.

(1) Yield of granular polymer

After completion of the polymerization reaction, the resulting reaction mixture was sifted through screens different in screen opening in the following manner to separate into their corresponding particle sizes. A polymer captured on a screen having an opening diameter of 150 pm (100 mesh) was regarded as "a granular polymer", while a polymer passing through the screen of 100 mesh, but captured on a screen having an opening diameter of 38 µm (390 mesh) was regarded as "a powdered polymer". The yields of the granular polymer and the powdered polymer were determined on the basis of the weight (calculated value) on the assumption that sodium sulfide in an autoclave after a dehydration step was fully converted to PPS. In the case where sodium sulfide is charged in excess of the dihalo-aromatic compound, it may not be fully converted to PPS. Even in such a case, the yield is viewed on the basis of the weight of sodium sulfide for the present.

(2) Whiteness of polymer

The whiteness of a polymer sample is expressed in terms of YI (yellowness index). YI is determined in accordance with JIS K-7103. An aluminum ring having an inner diameter of 32 mm and a height of 5 mm is charged with 2.2 g of the polymer sample and compressed by a hydraulic molding machine. With respect to a tablet thus obtained, the YI (yellowness index) on its surface is measured by a color-difference meter.

Example 1

A 20-1 autoclave was charged with 6,000 g of N-methyl-2-pyrrolidone (NMP), 3,800 g of sodium sulfide pentahydrate crystals containing 46.20 wt. % of sodium sulfide ($Na_2S$) and 9.5 g of sodium hydroxide having a purity of 97%. After purging with nitrogen gas, the temperature of the reaction system was gradually raised to 200° C. over about 3.5 hours while stirring by a stirrer at 250 rpm, thereby distilling off 1,542 g of water, 1,116 g NMP and 0.440 mole of hydrogen sulfide. At this time, the amount of sodium sulfide in the autoclave (sodium sulfide charged) was reduced to 22.05 moles, and so the amount of sodium hydroxide per mole of sodium sulfide amounted to 0.05 mole.

After the dehydration step described above, the system was cooled to 170° C., and 3,371 g (1.04 moles/mole of sodium sulfide) of p-dichlorobenzene (hereinafter abbreviated as "p-DCB"), 3,385 g of NMP and 109 g of water were added (total water content in the autoclave: 1.5 moles/mole of sodium sulfide). As a result, the temperature in the autoclave was lowered to 140° C. Subsequently, the temperature of the system was raised to 180° C. over 30 minutes while stirring by the stirrer at 250 rpm, and then elevated from 180° C. to 220° C. over 60 minutes (the rate of reaction of the halogen radicals in the dihalo-aromatic compound was 29%). Then, the temperature was continuously raised (average heating rate: 0.33° C./min) from 220° C. to 240° C. over 60 minutes (the rate of reaction of the halogen radicals in the dihalo-aromatic compound was 78%). Further, the temperature was raised (average heating rate: 0.67° C./min) from 240° C. to 260° C. over 30 minutes, thereby conducting preliminary polymerization.

The preliminary polymerization was separately conducted in the same procedure, and the resultant polymerization slurry was sampled to determine the residual p-DCB content in the slurry by gas chromatography, from which the conversion of p-DCB was determined in accordance with the above equation (a) for calculation of conversion. The conversion was found to be 91.8%.

Directly after completion of the preliminary polymerization, the number of revolutions of the stirrer was raised to 400 rpm, and 449 g of water were introduced under pressure into the autoclave at 260° C. (total water content in the autoclave: 2.7 moles/mole of sodium sulfide). After the introduction of water under pressure, the temperature in the autoclave was lowered to 243° C. The temperature was raised to 255° C., and the reactants were reacted for 4 hours at the same temperature, thereby conducting final polymerization. The conversion of p-DCB at the time of completion of the final polymerization was found to be 100%. A total time from the time of the polymerization temperature of 220° C. in the preliminary polymerization step to the completion of the final polymerization was about 6 hours.

After completion of the final polymerization, the reaction mixture was cooled near to room temperature, and the contents were sifted through a screen of 100 mesh to separate a granular polymer. The thus-separated granular polymer was washed with acetone and 3 times with water, thereby obtaining a washed polymer. This washed polymer was immersed in a 2% aqueous solution of ammonium chloride to treat the polymer at 40° C. for 30 minutes and then washed with water. The resultant granular polymer was dried at 105° C. for 3 hours. The granular PPS polymer thus obtained had an average particle size of 528 µm and a melt viscosity of 64 Pa·s. The yield and YI value of this polymer was 81% and 6, respectively.

Example 2

Charging was conducted in the same manner as in Example 1 except that 30.8 g of sodium hydroxide were further added to perform a dehydration step. As a result, 1,603 g of water, 1,046 g of NMP and 0.458 mole of $H_2S$ were distilled off. At this time, the amount of sodium sulfide in the autoclave (sodium sulfide charged) was reduced to 22.04 moles, and so the amount of sodium hydroxide per mole of sodium sulfide amounted to 0.075 mole. In a similar manner to Example 1, 3,369 g (1.04 moles/mole of sodium sulfide) of p-DCB, 3,311 g of NMP and 170 g of water were then added (total water content in the autoclave: 1.5 moles/mole of sodium sulfide). As a result, the temperature in the autoclave was lowered to 140° C. The temperature of the system was raised to 180° C. over 30 minutes, and then elevated from 180° C. to 220° C. over 60 minutes (the rate of reaction of the halogen radicals in the dihalo-aromatic compound was about 30%). Then, the temperature was continuously raised (average heating rate: 0.33° C./min) from 220° C. to 240° C. over 60 minutes (the rate of reaction of the halogen radicals in the dihalo-aromatic compound was about 80%). Further, the temperature was raised (average heating rate: 0.67° C./min) from 240° C. to 260° C. over 30 minutes, thereby conducting preliminary polymerization. The conversion of p-DCB at the time of completion of the preliminary polymerization as determined in the same manner as in Example 1 was found to be 91.7%.

Directly after completion of the preliminary polymerization, the number of revolutions of a stirrer was raised to 400 rpm, and 488 g of water were introduced under pressure into the autoclave (total water content in the autoclave: 2.8 moles/mole of sodium sulfide). Thereafter, the temperature of the reaction system was raised to 265° C. to react the reactants for 2 hours, thereby conducting final polymerization. The conversion of p-DCB at the time of completion of the final polymerization was found to be 100%. A total time from the time of the polymerization temperature of 220° C. in the preliminary polymerization to the completion of the final polymerization was about 4 hours. The resultant reaction mixture was treated in the same manner as in Example 1, thereby obtaining a granular polymer having an average particle size of 485 μm and a melt viscosity of 49 Pa·s at a yield of 92%. The YI value of this polymer was 5.

Example 3

Charging was conducted in accordance with the same formulation as in Example 1 to perform a dehydration step. As a result, 1,532 g of water, 1,040 g of NMP and 0.481 mole of $H_2S$ were distilled off. At this time, the amount of available sodium sulfide in the autoclave (sodium sulfide charged) was reduced to 22.01 moles. In a similar manner to Example 1, 3,365 g (1.04 moles/mole of sodium sulfide) of p-DCB, 3,294 g of NMP and 99 g of water were added (total water content in the autoclave: 1.5 moles/mole of sodium sulfide). As a result, the temperature in the autoclave was lowered to 140° C. The temperature of the system was raised to 180° C. over 30 minutes, and then elevated from 180° C. to 220° C. over 60 minutes (the rate of reaction of the halogen radicals in the dihalo-aromatic compound was about 30%). Then, the temperature was continuously raised (average heating rate: 0.33° C./min) from 220° C. to 240° C. over 60 minutes (the rate of reaction of the halogen radicals in the dihalo-aromatic compound was about 80%). The temperature was then raised (average heating rate: 0.67° C./min) from 240° C. to 260° C. over 30 minutes, thereby conducting preliminary polymerization. The conversion of p-DCB at the time of completion of the preliminary polymerization was found to be 91.7%.

Directly after completion of the preliminary polymerization, the number of revolutions of a stirrer was raised to 400 rpm, and a liquid mixture composed of 183 g (0.1 mole/mole of sodium sulfide) of anhydrous sodium acetate (purity: 98.5%) and 448 g of water was introduced under pressure into the autoclave (total water content in the autoclave: 2.8 moles/mole of sodium sulfide). The temperature in the autoclave was raised to 255° C. to react the reactants for 4 hours, thereby conducting final polymerization. The conversion of p-DCB at the time of completion of the final polymerization was found to be 100%. A total time from the time of the polymerization temperature of 220° C. in the preliminary polymerization to the completion of the final polymerization was about 6 hours. The resultant reaction mixture was treated in the same manner as in Example 1, thereby obtaining a granular polymer having an average particle size of 1,630 μm and a melt viscosity of 78 Pa·s at a yield of 87%. The YI value of this polymer was 7.

Comparative Example 1

Charging was conducted in the same manner as in Example 2, thereby performing a dehydration step and preliminary polymerization. However, the preliminary polymerization was performed by raising the temperature of the reaction system to 220° C. and then keeping the system at this temperature. It took 4 hours and 30 minutes for the conversion of p-DCB to reach 91.8% like Example 1. Directly after completion of the preliminary polymerization, the number of revolutions of a stirrer was raised to 400 rpm, and 488 g of water were introduced under pressure in the autoclave (total water content in the autoclave: 2.8 moles/mole of sodium sulfide). As a result, the temperature in the autoclave was lowered to 210° C. From another experiment, it was observed that a prepolymer was precipitated during the addition of water. It took about 1 hour to raise the temperature of the reaction system from 210° C. to 255° C. even when applying the same quantity of heat per unit time as that of Example 1. The reactants were reacted at 255° C. for 4 hours, thereby conducting final polymerization. The conversion of p-DCB at the time of completion of the final polymerization was found to be 100%. A total of time of from the point of time of the polymerization temperature of 220° C. in the preliminary polymerization to the completion of the final polymerization was 9 hours and 30 minutes.

The resultant reaction mixture was treated in the same manner as in Example 1, thereby obtaining a granular polymer having an average particle size of 550 μm and a melt viscosity of 51 Pa·s at a yield of 83%. The YI value of this polymer was 13.

Comparative Example 2

In a similar manner to Comparative Example 1, charging, dehydration step, preliminary polymerization and final polymerization were performed, provided that the time period of the final polymerization was shortened to 1 hour. A total time from the time of the polymerization temperature of 220° C. in the preliminary polymerization to the completion of the final polymerization was 6 hours and 30 minutes.

The resultant reaction mixture was treated in the same manner as in Example 1, thereby obtaining a granular polymer having an average particle size of 500 μm and a melt viscosity of 30 Pa·s at a yield of 71%.

Comparative Example 3

In a similar manner to Comparative Example 1, charging, dehydration step and preliminary polymerization were performed, provided that the temperature of the reaction system was raised at a heating rate of 2° C./min from 220° C. to 240° C. in order to shorten the polymerization time. However, the heating rate was suddenly accelerated the course of the heating due to rapid exothermic reaction, and so it was impossible to control the reaction temperature. Since the pressure also suddenly increased, the preliminary polymerization was immediately stopped.

From the results of these examples and comparative examples, it is understood that when a polymerization reaction is performed under the specified conditions like the present invention, a granular polymer high in molecular weight and excellent in handling properties can be produced in a short period of time (comparison between Examples 1–3 and Comparative Example 1) and at a high yield (comparison between Examples 1–3 and comparative Example 2). When a specific amount of the polymerization stabilizer (Example 2) or the polymerization aid (Example 3) is used, it is possible to further improve the yield, heighten the polymerization degree and/or enlarge the particle size of the resulting polymer. According to the process of the present invention, a polymer having higher whiteness can be provided.

What is claimed is:

1. A process for producing poly(phenylene sulfide), in which an alkali metal sulfide is reacted with a dihalo-aromatic compound in an organic amide solvent, which comprises conducting the following Steps 1 and 2:

Step 1:

reacting the alkali metal sulfide with the dihalo-aromatic compound within a temperature range of 180°–265° C. in the organic amide solvent containing water in a proportion of 0.5–2.0 moles per mole of the alkali metal sulfide charged while (i) raising the reaction temperature at an average heating rate of not higher than 1° C./min in a temperature range of from 180° C. to 220° C., so as to obtain a conversion of 0–45% of the halogen moiety of the dihalo-aromatic compound, then (ii) raising the reaction temperature at an average heating rate of 0.2–0.5° C./min in a temperature range of from 220° C. to 240° C. until conversion of the halogen moiety of the dihalo-aromatic compound reaches 60–90%, further (iii) raising the reaction temperature at an average heating rate of not higher than 1° C./min within a temperature range of from 240° C. to 260° C., so as to obtain a conversion of the dihalo-aromatic compound of 95–95 mol %, thereby forming a prepolymer of poly(phenylene sulfide); and Step 2:

adding water to the reaction system at a temperature of at least 235° C. in such a manner that water is present in a proportion of 2.1–10 moles per mole of the alkali metal sulfide charged, and continuing the reaction for 1–5 hours within a temperature range of from 250° C. to 270° C., thereby converting the prepolymer to high-molecular weight poly(phenylene sulfide).

2. The process according to claim 1, wherein in at least one of Steps 1 and 2, at least one compound selected from the group consisting of alkali metal hydroxides, alkali metal carbonates, alkaline earth metal hydroxides and alkaline earth metal carbonates is caused to exist in the reaction system in a proportion of 0.05–0.2 mole per mole of the alkali metal sulfide charged.

3. The process according to claim 1, wherein in at least one of Steps 1 and 2, at least one compound selected from the group consisting of alkali metal carboxylates and lithium halides is caused to exist in the reaction system in a proportion of 0.02–0.2 mole per mole of the alkali metal sulfide charged.

4. The process according to claim 1, wherein the charged amount of the dihalo-aromatic compound is limited within a range of 0.9–2.0 moles per mole of the alkali metal sulfide charged.

* * * * *